A. SCHROEDER.
FAUCET ATTACHING DEVICE.
APPLICATION FILED FEB. 25, 1918.

1,278,511.

Patented Sept. 10, 1918.

Anthony Schroeder
Inventor

By John A. Bommhardt
Attorney

UNITED STATES PATENT OFFICE.

ANTHONY SCHROEDER, OF CLEVELAND, OHIO.

FAUCET-ATTACHING DEVICE.

1,278,511.　　　　Specification of Letters Patent.　　Patented Sept. 10, 1918.

Application filed February 25, 1918. Serial No. 219,027.

*To all whom it may concern:*

Be it known that I, ANTHONY SCHROEDER, a citizen of the United States, residing at Cleveland, in the county of Cuyahoga and State of Ohio, have invented certain new and useful Improvements in Faucet-Attaching Devices, of which the following is a specification.

This invention is a combined bung and faucet of that type in which the faucet is attached to the bung in reverse position, that is, inside the barrel or package to which the bung is applied.

These devices are used particularly on metal barrels or drums, the faucet being located inside the barrel during shipment, and when the liquid is to be dispensed the bung is removed, the faucet is detached therefrom and placed in a suitable opening and the bung is replaced to serve its ordinary purpose.

The present invention has advantages with respect to strength of the bung, and respect to the security with which the faucet is held thereby with less liability of becoming detached and dropping within the barrel than with some other devices of the same kind.

In the accompanying drawings:—

Figure 1:
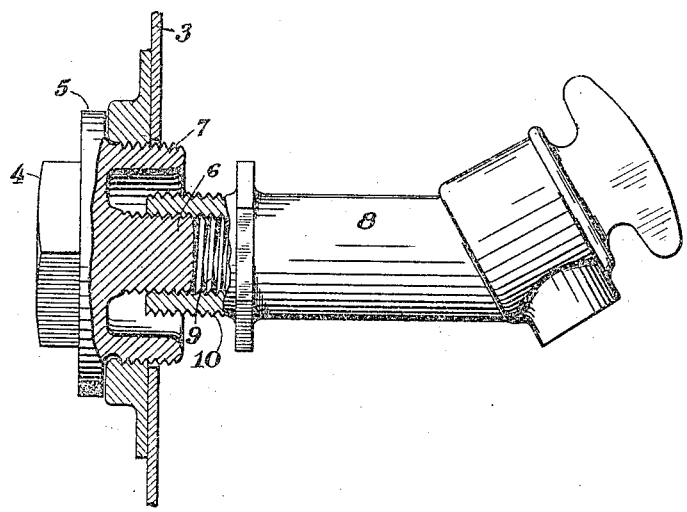
Figure 1 is a sectional view of the device.
Figure 2:
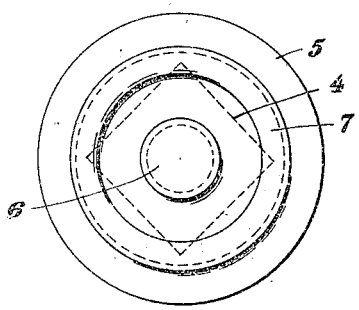
Fig. 2 is an inside plan view of the bung.

Referring specifically to the drawings, 3 indicates the wall of a barrel or other container provided with a threaded bung hole to receive the bung. The bung consists of a screw plug having a square head 4 to receive a wrench, a flange 5 which stops against the outside of the barrel, and a circular wall 7 which is threaded on the outside to screw into the bung hole. Also, the bung is provided at its axis or center on the inside, with a threaded stud 6 which is preferably of considerable length, that is, long enough to provide sufficient threads to give a firm attachment for the faucet.

The faucet 8 may be of any suitable or standard type, with the addition, however, that the inner end of its bore is threaded as indicated at 9 to screw on the stud 6. The exterior is also threaded as shown at 10 to screw into the usual opening when the faucet is attached for dispensing purposes.

In the use of the article, the faucet is screwed on to the stud 6, as shown in Fig. 1, and the bung is then set in place with the faucet inside the barrel. The barrel can then be shipped without possible injury to the faucet. By removing the bung, the faucet can be detached for use, and the bung replaced to close the bung hole.

I claim:

1. The combination of a screw plug having an exteriorly-threaded circular wall and a flange at the outer end of said wall, adapted to stop against the outside of the package into which the plug is screwed, a central threaded stud projecting within said wall, with its free end directed inwardly, and a faucet screwed on to the stud.

2. The combination with a bung having a circular wall threaded exteriorly to screw into a bung hole and a central threaded stud projecting inwardly within said wall, of a faucet having a threaded bore adapted to screw on to the stud.

In testimony whereof, I do affix my signature in presence of two witnesses.

ANTHONY SCHROEDER.

Witnesses:
G. N. ROSENBERG,
JOHN A. BOMMHARDT.